(12) United States Patent
Boerger et al.

(10) Patent No.: US 10,901,479 B1
(45) Date of Patent: Jan. 26, 2021

(54) METHOD AND APPARATUS FOR MANAGING POWER-UP OF A PORTABLE COMMUNICATION DEVICE

(71) Applicant: MOTOROLA SOLUTIONS, INC, Chicago, IL (US)

(72) Inventors: Mark A. Boerger, Plantation, FL (US); David Viviescas, Doral, FL (US); Yehuda Rokach, Ashkelon (IL); Mark Antilla, Davie, FL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 93 days.

(21) Appl. No.: 16/392,168

(22) Filed: Apr. 23, 2019

(51) Int. Cl.
| | |
|---|---|
| *G06F 1/28* | (2006.01) |
| *G06F 1/32* | (2019.01) |
| *G06F 1/3206* | (2019.01) |
| *G06F 1/3212* | (2019.01) |
| *G06F 1/3287* | (2019.01) |
| *G06F 9/4401* | (2018.01) |
| *H04W 88/02* | (2009.01) |

(52) U.S. Cl.
CPC .......... *G06F 1/3212* (2013.01); *G06F 1/3287* (2013.01); *G06F 9/4401* (2013.01); *H04W 88/02* (2013.01)

(58) Field of Classification Search
CPC .... G06F 1/3212; G06F 1/3287; G06F 9/4401; H04W 88/02
See application file for complete search history.

(56) References Cited

U.S. PATENT DOCUMENTS

| | | | |
|---|---|---|---|
| 4,551,854 A | 11/1985 | Rutty et al. | |
| 4,637,022 A | 1/1987 | Burke et al. | |
| 4,684,870 A | 8/1987 | George et al. | |
| 5,263,092 A | 11/1993 | Jang | |

(Continued)

FOREIGN PATENT DOCUMENTS

| | | |
|---|---|---|
| JP | 2006148671 | 6/2006 |
| WO | 0011781 | 3/2000 |

OTHER PUBLICATIONS

Nagari et al. "An 8 Omega 2.5 W1%-THD 104 dB(A)-Dynamic-Range Class-D Audio Amplifier With Ultra-Low EMI System and Current Sensing for Speaker Protection," IEEE Journal of Solid-State Circuits, IEEE Service Center, Piscataway, NJ, USA, vol. 47, No. 12,1 (Dec. 1, 2012) pp. 3068-3080, XP011485432, ISSN: 0018-9200, DOI: 10.1109/JSSC.2012.2225762, Chapters I and II; abstract; figure 1.

(Continued)

*Primary Examiner* — Abdelmoniem I Elamin
(74) *Attorney, Agent, or Firm* — Barbara R. Doutre

(57) ABSTRACT

A battery operated portable communication device (100) provides improved power up of converged functionality managed by a power arbitration module (PAM) (104), a baseband processor (BP) (108), and an applications processor (AP) (104). In response to a control switch (120) being turned on, the baseband processor generates a time delay and asserts a boot-line to the applications processor which prevents full power up of the applications processor and during which a battery impedance is read, thereby preventing simultaneous power up of the AP and BP. The boot-line from the baseband processor to the applications processor is released once the BP power up is complete and battery impedance is read.

20 Claims, 3 Drawing Sheets

(56) References Cited

U.S. PATENT DOCUMENTS

| | | | |
|---|---|---|---|
| 6,615,360 B1* | 9/2003 | Amini | G06F 1/26 |
| | | | 713/1 |
| 6,792,553 B2* | 9/2004 | Mar | G06F 1/26 |
| | | | 327/143 |
| 6,809,504 B2 | 10/2004 | Tang et al. | |
| 6,853,242 B2 | 2/2005 | Melanson et al. | |
| 7,046,755 B2 | 6/2006 | Dupuis et al. | |
| 7,550,975 B2 | 6/2009 | Honda et al. | |
| 7,697,704 B2 | 4/2010 | Brooks et al. | |
| 7,782,018 B2 | 8/2010 | Voigt | |
| 8,295,950 B1 | 10/2012 | Wordsworth et al. | |
| 8,619,653 B2 | 12/2013 | Ji et al. | |
| 8,676,273 B1 | 3/2014 | Fujisaki | |
| 8,683,187 B2 | 3/2014 | Ho-Sun et al. | |
| 8,843,774 B2 | 9/2014 | Chen et al. | |
| 8,874,097 B1 | 10/2014 | Warsaw et al. | |
| 9,075,090 B2 | 7/2015 | Zimmerman et al. | |
| 9,131,452 B2 | 9/2015 | Bartels et al. | |
| 9,281,704 B2 | 3/2016 | Heo et al. | |
| 9,374,787 B2 | 6/2016 | Delind Van Wijngaarden et al. | |
| 9,472,967 B2 | 10/2016 | Nunez et al. | |
| 9,774,966 B1 | 9/2017 | Budny et al. | |
| 9,892,691 B1 | 2/2018 | Lim et al. | |
| 9,955,429 B2 | 4/2018 | Perakamppi et al. | |
| 10,152,112 B2* | 12/2018 | Ehmann | G06F 9/4403 |
| 10,795,422 B2* | 10/2020 | Sachs | G06F 1/3206 |
| 2002/0087906 A1* | 7/2002 | Mar | G06F 1/305 |
| | | | 713/330 |
| 2006/0247920 A1 | 11/2006 | Toriyama | |
| 2007/0244587 A1 | 10/2007 | Yamamoto | |
| 2008/0016070 A1 | 1/2008 | Ogawa et al. | |
| 2008/0161071 A1 | 7/2008 | Sherman | |
| 2011/0167252 A1 | 7/2011 | Gelman et al. | |
| 2012/0083902 A1 | 4/2012 | Daum et al. | |
| 2012/0101640 A1 | 4/2012 | Stapelfeldt | |
| 2014/0169796 A1 | 6/2014 | Sasaki et al. | |
| 2015/0058644 A1 | 2/2015 | Lee | |
| 2016/0036260 A1 | 2/2016 | Nunez et al. | |
| 2016/0048184 A1* | 2/2016 | Basile | G06F 8/65 |
| | | | 713/310 |
| 2016/0216978 A1 | 7/2016 | Dangy-Caye | |
| 2016/0363985 A1* | 12/2016 | Ehmann | G06F 13/37 |
| 2020/0033932 A1* | 1/2020 | Sachs | G06F 1/3206 |

OTHER PUBLICATIONS

U.S. Appl. No. 16/048,391, filed Jul. 30, 2018, all pages.

* cited by examiner

METHOD AND APPARATUS FOR MANAGING POWER-UP OF A PORTABLE COMMUNICATION DEVICE

FIELD OF THE INVENTION

This application pertains to portable communication devices and more particularly to managing the power-up of battery operated portable communication devices.

BACKGROUND OF THE INVENTION

Portable battery powered communication devices are often utilized in public safety environments, such as law enforcement, fire rescue, and the like, to provide mission critical communications operating over a public safety platform, such as a land mobile radio (LMR) platform. There is an increased desire to expand the functionality of public safety communication devices to incorporate additional features that run on different operating platforms, other than the main LMR public safety platform. Adding features that operate on different platforms requires the use of at least one additional processor. The use of multiple processors and features running on different platforms increases current demand placed on the battery of the communication device. Each of the multiple processors independently drawing a variable amount of power makes characterization of the communication device difficult. The aggregation of several features, particularly during power up, may even exceed a battery pack's peak current capability, thereby inducing a radio reset and possible loss of communication.

Hence, an improved power-up management approach is needed.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
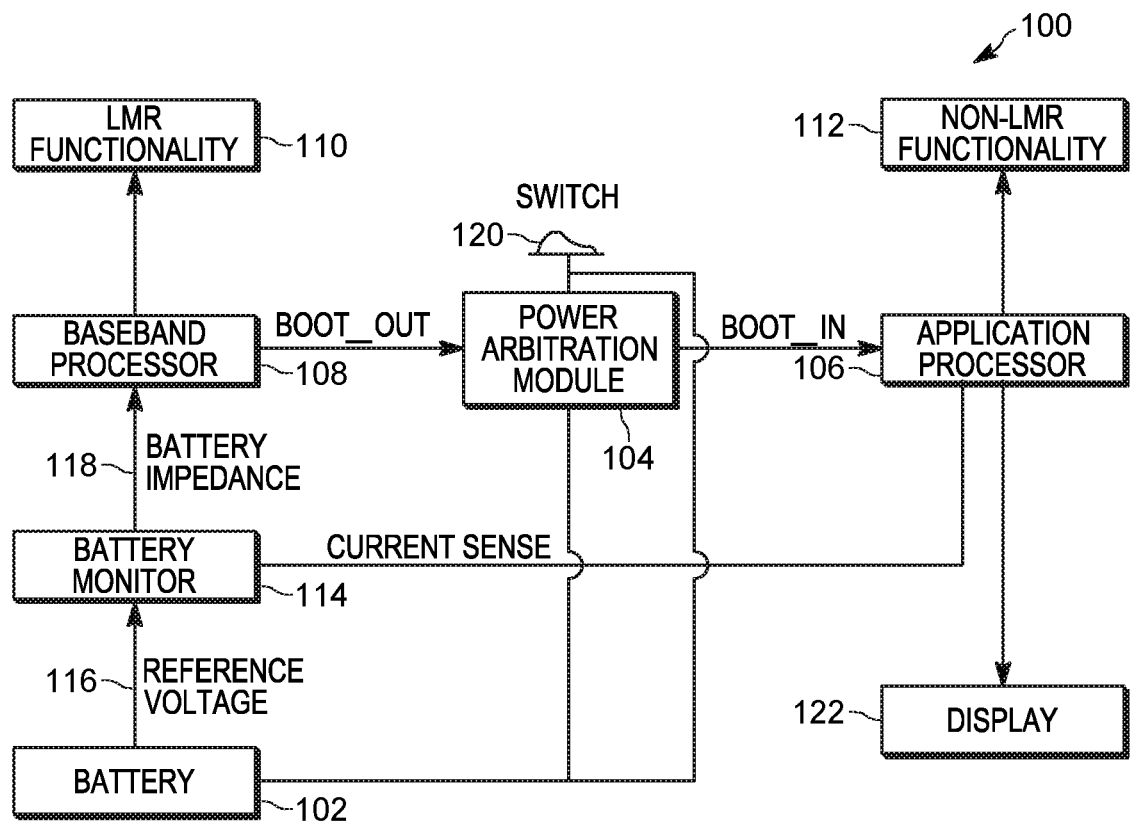
FIG. 1 is block diagram of a portable communication device formed and operating in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Briefly, there is provided herein an apparatus and method for dynamically controlling power up of a portable communication device. An apparatus embodiment is provided in which the portable communication device is powered by a battery having a power arbitration module operatively coupled thereto. The portable communication device is provided with two processors, an applications processor and a baseband processor which operate on different communication platforms. In accordance with some embodiments, the baseband processor generates a timeframe window within which the applications processor is prevented from fully powering up and within which a battery impedance of the battery is read by the baseband processor while the applications processor is in a non-operational idle state drawing idle current, thereby preventing simultaneous power up of the applications processor and baseband processor and avoiding the transient currents associated therewith. Boot line synchronization is used to control the delay of full power up. Obtaining the battery impedance during power-up without transients ensures a reliable battery parameter measurement which can be used, along with other parameters such as voltage and temperature, to accurately estimate the percentage of remaining battery life and to budget allowed operations which are dependent on the amount of instantaneously available current.

A method embodiment is provided in which switching the portable communication device from an off state to an on state power, results in applying power from the power arbitration module to the baseband processor. A time delay is triggered, after which power is supplied from the power arbitration module to the applications processor. The baseband processor detects whether the power up was a cold start (completely off) or a warm start (standby). In response to detecting a cold start, the baseband processor asserts a boot-line to hold the applications processor in idle mode while continuing the baseband processor's boot sequence. The applications processor remains in idle mode, while the baseband processor completes its power up and the baseband processor reads a battery impedance of the battery. The boot-line from the baseband processor to the applications processor is released once the baseband processor power up is complete and battery impedance is read. The power management approach provided by the embodiments avoids resets caused by transients impacting the impedance reading of the battery during power-up.

FIG. 1 is block diagram of a portable communication device 100 formed and operating in accordance with some embodiments. The portable communication device 100 comprises a battery 102 for powering the device, a power arbitration module (PAM) 104 operatively coupled to the battery, an applications processor (AP) 106 operatively coupled to the PAM, and a baseband processor (BP) 108 operatively coupled to the PAM. The portable communication device 100 is a converged device providing LMR functionality 110 controlled by the baseband processor 108 and additional non-LMR functionality 112 controlled by the applications processor 106. The PAM 104 may be implemented as a hardware logic device. A battery monitor 114 is operatively coupled between the battery 102 and baseband processor 108. The battery monitor 114 may be implemented with logic gates to determine the impedance of the battery 102. A power control switch 120, such as a rotary control switch, or other user-interface switch, is operatively coupled to the PAM 104 and the battery 102. The power control switch 120 is an external switch which can be activated by a user to turn on the portable communication device 100.

The LMR functionality 110 is provided by high power LMR elements for mission critical communications. Example of such elements include but are not limited to, a radio frequency (RF) transmitter, power amplifiers, high power audio, and push-to-talk (PTT) feature. The push-to-talk (PTT) feature is a feature used in two-way radio communications. Such high power mission critical LMR functions are under the control of the baseband processor 108 while the non-LMR functionality is controlled by the applications processor 106. The non-LMR functionality provides at least one high current feature, such as long term evolution (LTE), text-to-speech, and/or touch screen display features to name a few. The non-LMR functionality, may include, low current drain features, for example, BLUETOOTH, WiFi, global positioning system (GPS), and/or other low current non-LMR functionality. The managed approach to power-up provided herein addresses conditions, such as cold temperature, under which the battery 102 powering the portable communication device 100 may have insufficient capacity to handle transients associated with the simultaneous power up of the two processors 106, 108.

Power up is enabled by control switch 120. The PAM 104 detects the switch 120 and applies power to the baseband processor 108. The application of power to the BP 108 triggers an internal BP timer which generates a timeframe window within which the applications processor 106 is prevented from fully powering up and within which the battery impedance 118 is read by the baseband processor 108. The battery impedance is thus read while the applications processor 106 is in a non-operational idle state drawing idle current. The prevention of simultaneous power up of the applications processor 106 and baseband processor 108 avoids resets to the portable communication device 100.

The portable communication device 100 may further comprise a user interface display 122 providing a power indicator during the power up idle mode, thereby providing a positive user interface even though the communication device is not fully powered on yet. The display 122 may indicate, for example, that the device is beginning to power-up, such as "STARTING POWER UP". Such a notification alerts the user that the device is not quite ready for full converged operation. The only current drain on the applications processor 106 at this point would be from the display, which is a minimal current.

The baseband processor 108 detects whether the power up was a cold start (completely off other than PAM and BP) or a warm start (standby). In response to detecting a cold start, the baseband processor 108 asserts a boot-line, via the PAM 104, to hold the applications processor 106 in idle mode and begin a boot sequence, while the baseband processor completes its power up and reads a battery impedance of the battery. The battery impedance is determined by the battery monitor 114 which converts a reference voltage 116 of the battery 102 into a battery impedance measurement 118. The battery impedance measurement is thus obtained without the presence of transients from the applications processor 106, providing for a very reliable measurement that can be used to determine remaining battery life, available current, and other parameters pertaining to the battery.

Asserting the boot-line to the applications processor 106 may further trigger an AP hold timer internal to the AP. The AP hold timer may be set for a time greater than the BP power up time. Upon expiration of the AP hold timer, the applications processor 106 launches into a boot-loader mode which allows for programming of the AP, but not general operations of the AP. Alternatively, the baseband processor 108 can release the boot-line to the applications processor 106, via the PAM 104, prior to the AP hold timer expiring in response to the baseband processor being completely powered up, thereby allowing the applications processor 106 to begin a boot sequence, the completion of which completes power up of the portable communication device.

Initialization of hardware and launching of software applications takes place during the boot sequence eventually leading to a complete AP power up. Hence, the applications processor 106 may be booted in two ways: (1) the AP hold timer expires; or (2) the baseband processor 108, upon complete BP power up, releases the boot-line prior to the AP hold timer expiration.

Figure 2:
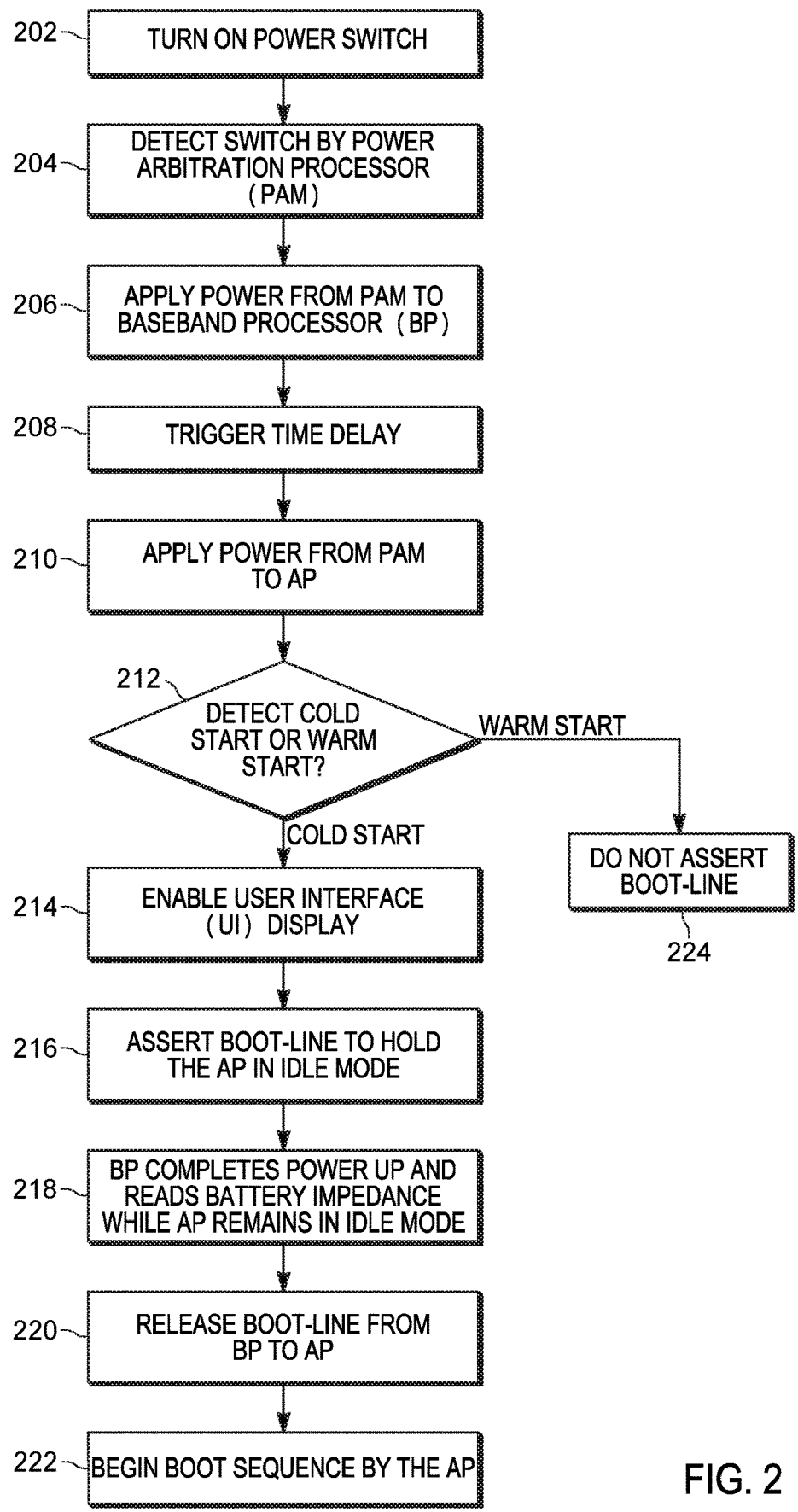
FIG. 2 is a flowchart of a method for managing power up of a portable communication device in accordance with some embodiments.

FIG. 2 is a flowchart of a method 200 for managing power up of the portable communication device 100 of FIG. 1 in accordance with some embodiments. The method 200 begins with the power arbitration module (PAM), baseband processor (BP), and applications processor (AP), being in an OFF state and turning on a power switch of the device at 202, such as a rotary control power switch, or other user interface switch as previously described. Abbreviations will be used for the description of FIG. 2. At 204 the PAM detects the switch and applies power to the baseband processor at 206. The application of power to the to the BP triggers a time delay controlled by the BP at 208.

After expiration of the time delay (e.g. 5 ms), power is applied from the PAM to the AP at 210. The BP then detects one of: a cold start or a warm start at 212. In a cold begins in an OFF state. In a warm start, the BP, the PAM begin in the OFF state, and the AP is in a standby state only requiring a wake up sequence. Warm start conditions may occur as a result of a "low power standby/fast turn on mode" feature being enabled, wherein the AP goes into a standby mode instead of fully turning off. When the communication device is turned back on, the AP only needs to wake up rather than going through its entire power up sequence.

In response to detecting a cold start, a user interface display, such as display 122 of FIG. 1, may be enabled at 214, if desired. The display may indicate, for example, that the device is beginning to power-up, such as "STARTING POWER UP" or the like. Such a notification alerts the user that the device is not quite ready for full converged operation. The only current drain on the AP at this point would be that being drawn from the display.

During or prior to the time that the notification is displayed, the BP asserts a boot-line to hold the AP in idle mode at 216. In response to the boot-line being asserted by the BP at 216, the AP remains in idle mode while the BP completes its power up and reads a battery impedance of the battery at 218. The battery impedance measurement is thus obtained without the presence of transients from the AP, providing for a very reliable measurement that can be used to determine remaining battery life, available current, and other parameters pertaining to the battery.

Asserting the boot-line to the AP at 216 may further comprise starting a hold timer by the AP. The AP hold timer is set for a time greater than the BP power up time, thereby guaranteeing full power up of the BP prior to expiration of the timer. Upon expiration of the timer, the AP launches into boot-loader mode which allows for programming of the AP, but not general operations of the AP. Alternatively, the BP can release the boot-line to the AP at 220, via the PAM, prior to the AP hold timer expiring (or even without the timer) in response to the BP being completely powered up, thereby allowing the AP 106 to begin the boot sequence at 222. Initialization of hardware and launching of software applications takes place during the boot sequence eventually leading to a complete AP power up.

When a warm start is detected at 212, then the BP does not assert the boot-line 224, and the AP can complete a wake up sequence. A warm start may occur as a result of a "low power standby/fast turn on mode" feature being enabled, wherein the AP goes into a standby mode instead of fully turning off. When the communication device is turned back on, the AP only needs to wake up rather than going through its entire power up sequence.

Figure 3:
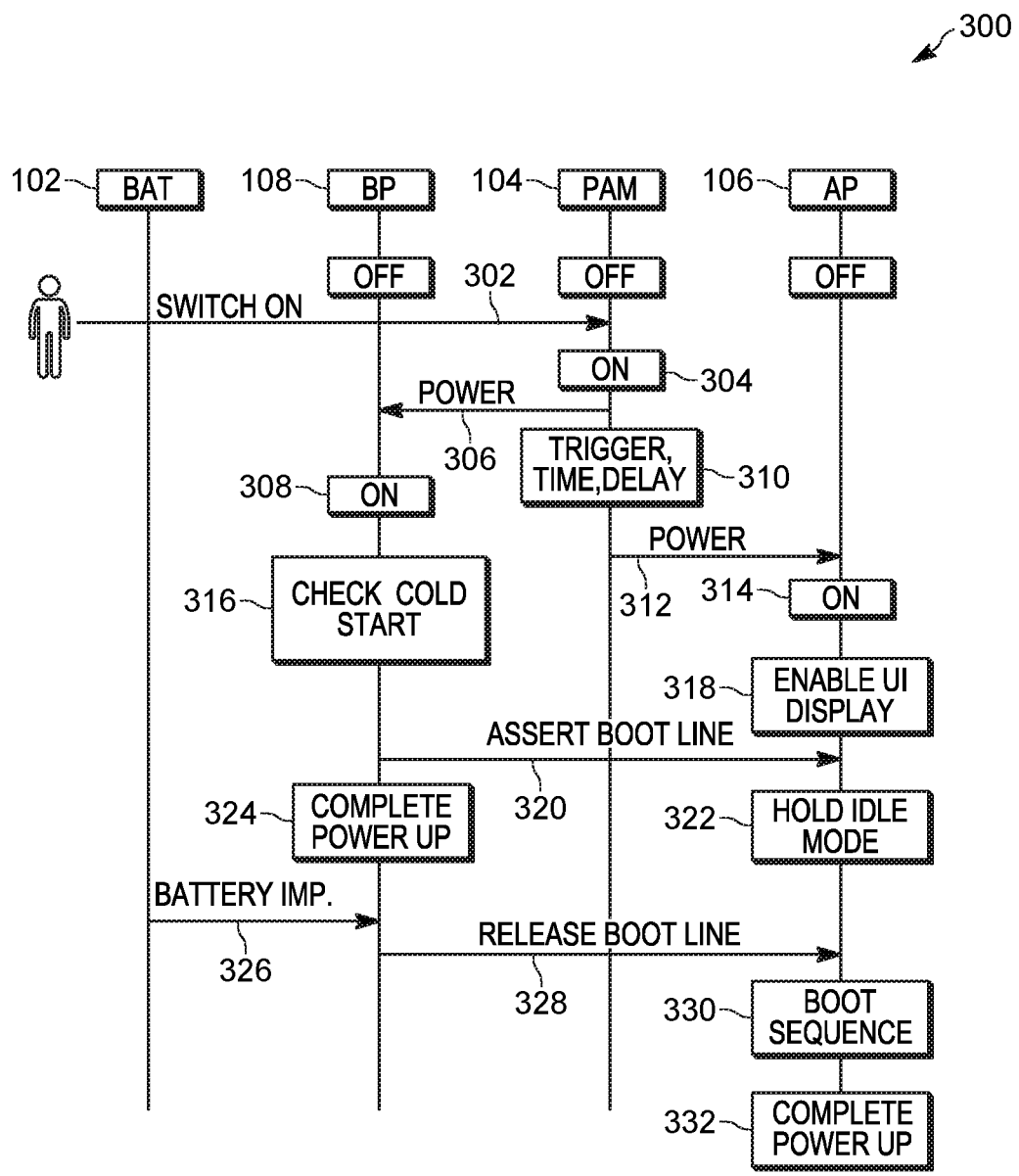
FIG. 3 is a sequence diagram for managing power-up of a portable communication device in accordance with some embodiments.

FIG. 3 is a sequence diagram 300 for managing power-up of a portable communication device, such as the portable communication device 100 of FIG. 1, in accordance with some embodiments. The sequencing takes place amongst battery (BAT) 102, a baseband processor (BP) 108, power arbitration module (PAM) 104, and applications processor (AP) 106. The PAM 104, AP 106, and BP 108 are all in the OFF state.

In response to a device power switch being enabled, power is applied at 302 from the battery 102 to the PAM 104, placing the PAM in an ON state 304. Placing the PAM 104 in the ON state triggers power being applied at 306 to the BP 108, thereby placing the BP in an ON state at 308.

Placing the PAM 104 in the ON state at 304 also triggers a time delay at 310 of the PAM 104. Upon expiration of the time delay 310, power is applied at 312 from the PAM 104 to the AP 106, thereby placing the AP 106 in an ON state at 314.

Cold start confirmation is made by the BP 108 at 316 (based AP-BP internal processor control lines). A user interface display is enabled by the AP at 318. The display provides, as previously described, a notification the device is in the process of being powered up.

The BP 108 asserts a boot line 320 which holds the AP 106 in idle mode at 322, while the BP 108 completes power up at 324. Battery impedance is provided to the BP 108 at 326. Again, obtaining the battery impedance during power-up without transients ensures a reliable battery parameter measurement which can be used, along with other parameters such as voltage and temperature, to accurately estimate the percentage of remaining battery life and to budget allowed operations which are dependent on the amount of instantaneously available current.

The BP 108 releases the boot line to the AP 106 at 328. Upon completing power up by the BP, the BP releases the boot line at 328 which triggers the AP 106 to enter a boot sequence at 330, thereby allowing the AP (no longer in idle mode) to complete power up at 332 in which initialization of hardware, launching of software applications, and AP features take place.

The power up management approach utilizing boot line synchronization for battery impedance determination facilitates and advantageously enables a-portable battery operated land mobile radio (LMR) device to expand its functionality to non-LMR functions, such as long term evolution (LTE), WiFi, and global positioning system (GPS), to name a few.

The approaches provided by the embodiments facilitate the implementation of converged devices by advantageously managing dual booting of two processors. In the past, parallel booting of the baseband processor and the application processor and associated platform operation would have generated an in-rush of current beyond the capacity of the battery The BP assertion of the boot-line for a period of time prevents full power up of the AP while a battery impedance is read. The boot-line from the BP to the AP is released once the BP power up is complete and battery impedance is read. The battery impedance is thus read without the presence of significant transients which could reset the communication device.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. An apparatus for controlling power up of a portable communication device, the apparatus comprising:
   a battery for powering the portable communication device;
   a power arbitration module (PAM) operatively coupled to the battery;
   an applications processor (AP) operatively coupled to the power arbitration module;
   a baseband processor (BP) operatively coupled to the power arbitration module; and
   the baseband processor generating a timeframe window within which the applications processor is prevented from fully powering up and within which a battery impedance is read by the baseband processor while the applications processor is in a non-operational idle state drawing idle current, thereby preventing simultaneous power up of the applications processor and the baseband processor.

2. The apparatus of claim 1, wherein the baseband processor asserts a boot-line to hold the applications processor in the non-operational idle state drawing idle current while the baseband processor completes power up and reads the battery impedance of the battery.

3. The apparatus of claim 2, wherein the applications processor is booted in response to at least one of:
   a hold timer expiring; and
   the baseband processor, upon completing BP power up, releasing the boot-line.

4. The apparatus of claim 1, further comprising:
   a display operatively coupled to the applications processor, the display providing a power indicator indicative of an idle mode during power up.

5. The apparatus of claim 1, further comprising:
   a battery monitor operatively coupled between the battery and the baseband processor, the battery monitor providing a battery impedance measurement of the battery to the baseband processor.

6. The apparatus of claim 1, wherein the battery powering the portable communication device is operating under conditions in which the battery has insufficient capacity to handle transients associated with simultaneous power up of the applications processor and the baseband processor.

7. The apparatus of claim 1, wherein preventing simultaneous power up of the applications processor and baseband processor further avoids resets to the portable communication device.

8. The apparatus of claim 1, wherein the baseband processor controls land mobile radio (LMR) functionality and the applications processor controls non-LMR functionality.

9. The apparatus of claim 8, wherein the non-LMR functionality comprises at least one of: long term evolution (LTE), speech-to-text, and touch screen features.

10. The apparatus of claim 8, wherein LMR functionality comprises push-to-talk (PTT).

11. A method for powering up a portable communication device, the method comprising:
    starting with an application processor (AP), a baseband processor (BP) and a power arbitration module (PAM) in an off state;
    turning on a switch operatively coupled to the PAM and a battery of the portable communication device;
    detecting the switch, by the PAM;
    applying power, from the PAM, to the BP;
    triggering a time delay by the PAM;
        applying power, from the PAM, to the AP after the time delay;
    detecting, by the BP, one of:
        a cold start;
        a warm start;
    in response to detecting a cold start, asserting by the BP, a boot-line to hold the AP in idle mode;
    in response to the boot-line being asserted by the BP, the AP remains in idle mode, while the BP completes its power up, and the BP reads a battery impedance of the battery;
    releasing the boot-line from the BP to the AP once the BP power up is complete and battery impedance is read; and
    in response to the boot-line being released by the BP, beginning a boot sequence by the AP to complete power up of the portable communication device.

12. The method of claim 11, wherein applying power, from the PAM, to the AP after the time delay further comprises:
    generating a power up indication by the AP;
    starting a hold off timer by the AP; and
    operating the AP in an idle low current mode.

13. The method of claim 11, further comprising:
    in response to detecting a warm start, not asserting the boot line by the BP, and completing a wake up sequence by the AP.

14. The method of claim 11, wherein asserting by the BP, a boot-line to hold the AP in idle mode further comprises:
    detecting the boot-line being asserted at the AP;
    starting a hold timer of the AP; and
    upon expiration of the hold timer, launching the AP into a boot-loader mode.

15. The method of claim 14, wherein the hold timer of the AP is set for a time greater than a power up time of the BP.

16. The method of claim 11, wherein battery impedance is read prior to beginning the boot sequence of the AP.

17. The method of claim 11, further comprising:
   providing a power indicator to a user interface display of the portable communication device, during idle mode, indicative of an idle mode during power up of the AP.

18. The method of claim 11, wherein the baseband processor controls land mobile radio (LMR) functionality and the applications processor controls non-LMR functionality.

19. The method of claim 18, wherein LMR functionality comprises push-to-talk (PTT).

20. The method of claim 18, wherein the non-LMR functionality comprises at least one of: long term evolution (LTE), speech-to-text, and touch screen features.

\* \* \* \* \*